No. 698,998. Patented Apr. 29, 1902.
W. McMEANS.
HAY LOADER.
(Application filed June 11, 1901.)
(No Model.) 2 Sheets—Sheet 2.
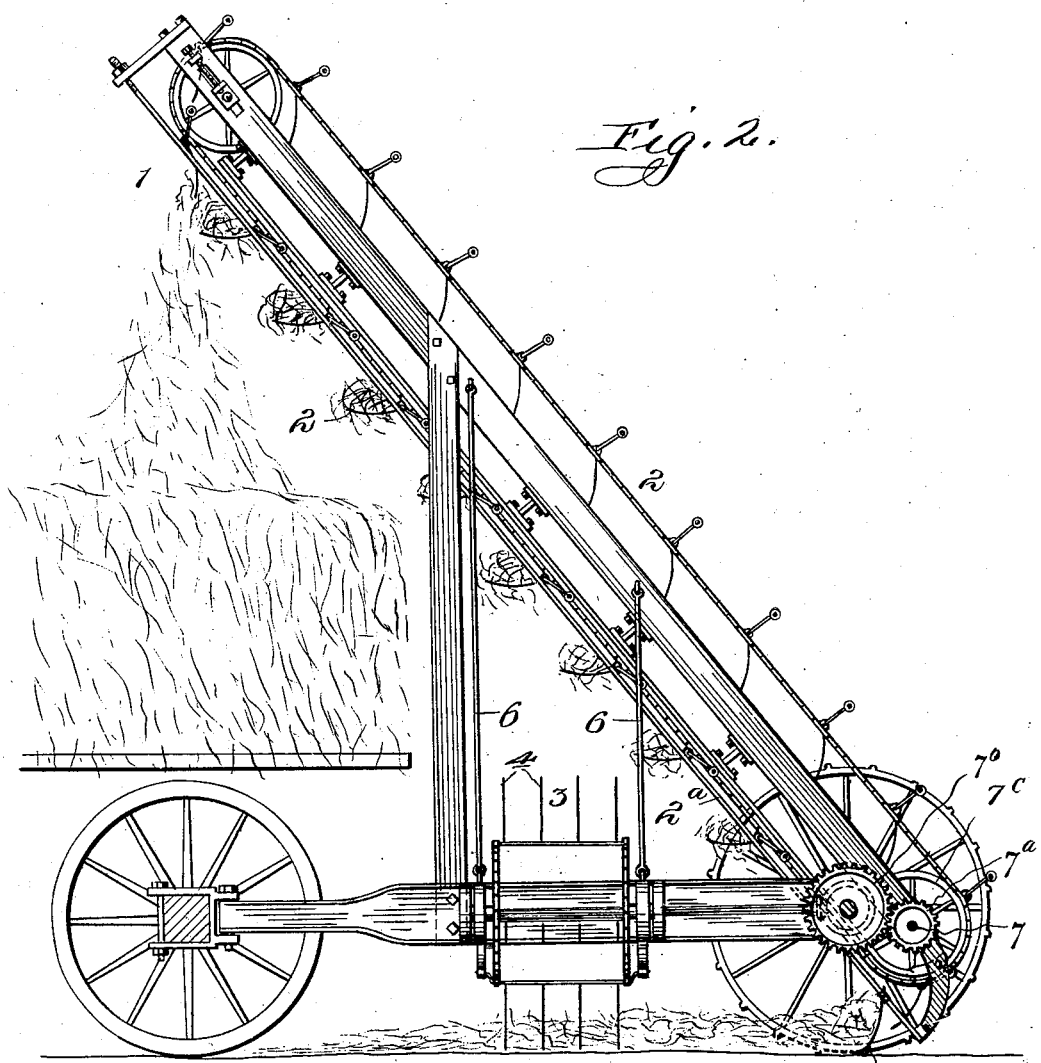
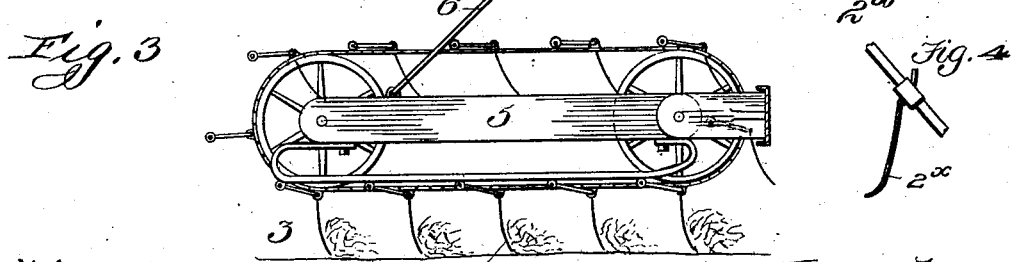
Witnesses:
Inventor:
William McMeans
By Edson Bro's
Att'ys

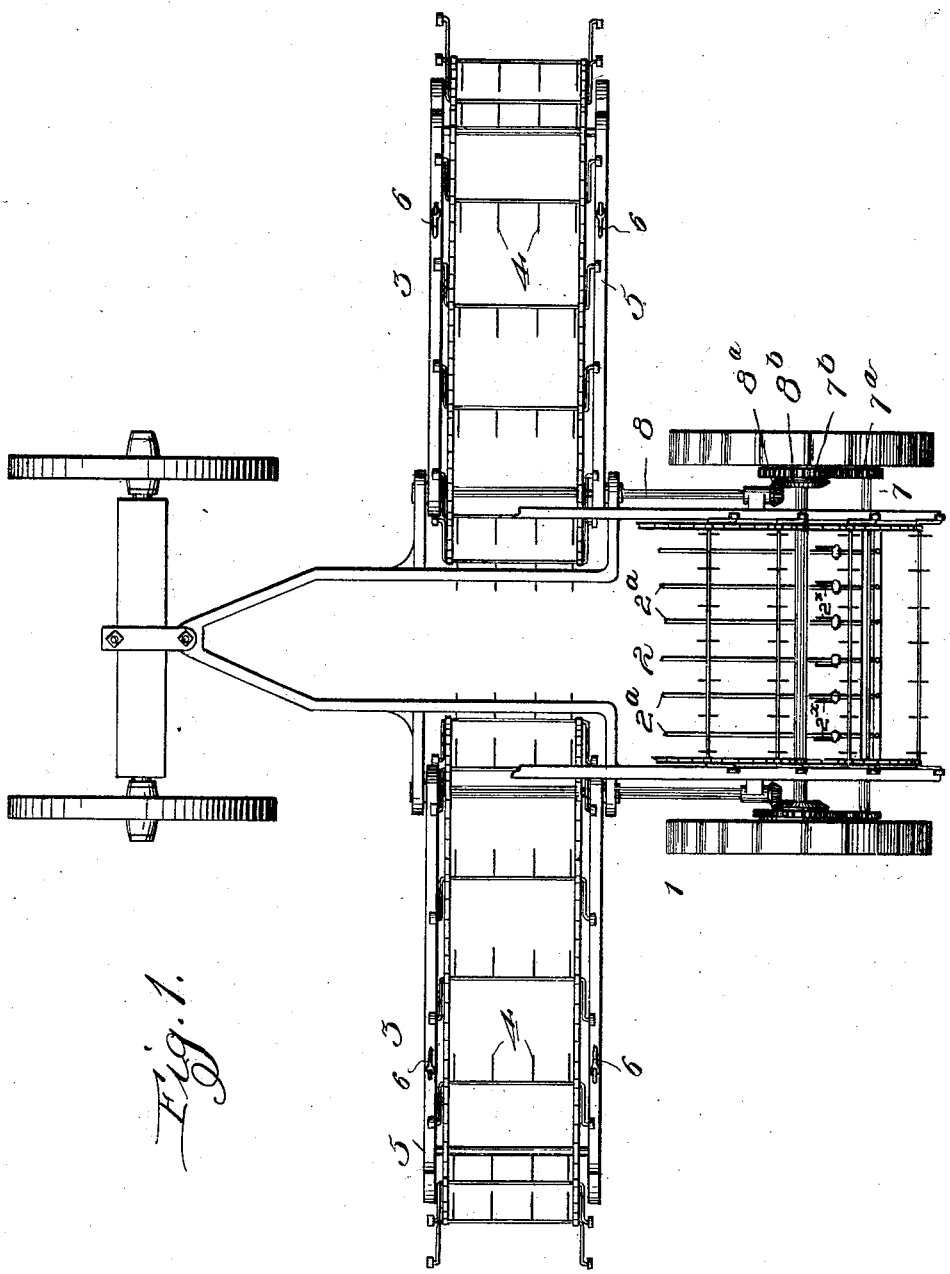

UNITED STATES PATENT OFFICE.

WILLIAM McMEANS, OF IANTHA, MISSOURI.

HAY-LOADER.

SPECIFICATION forming part of Letters Patent No. 698,998, dated April 29, 1902.

Application filed June 11, 1901. Serial No. 64,151. (No model.)

*To all whom it may concern:*

Be it known that I, WILLIAM MCMEANS, a citizen of the United States, residing at Iantha, in the county of Barton and State of Missouri, have invented certain new and useful Improvements in Hay-Loaders; and I do hereby declare the following to be a full, clear, and exact description of the invention, such as will enable others skilled in the art to which it appertains to make and use the same.

My invention relates to improvements in hay-loaders.

It has for its object to effect the lateral gathering or raking of the hay in connection with the usual straight-ahead gathering or raking operation as performed by the hay-loader; and it consists of the combination of the parts, including their construction and arrangement, substantially as hereinafter more fully disclosed, and specifically pointed out by the claims.

In the accompanying drawings, illustrating the preferred embodiment of my invention, Figure 1 is a plan view thereof. Fig. 2 is a side elevation, and Fig. 3 is a detached side view, of a lateral rake. Fig. 4 is an enlarged detail view more fully disclosing the construction of the stationary lateral rake-teeth.

Latitude is allowed herein as to details, as they may be changed or varied at will without departing from the spirit of my invention and the same yet remain intact and be protected.

In carrying out my invention, I suitably mount upon suitable running-gear a hay-loader 1, substantially of the construction shown or other preferred form. Said hay-loader may comprise principally an endless belt of teeth or forks 2, arranged in an inclined position, said teeth or forks being adapted to be disengaged or withdrawn from the elevated hay for its delivery into a wagon or vehicle, as indicated in Fig. 2.

Near the bottom of the hay-loader are suitably supported a series of stationary lateral rake-teeth $2^\times$, having lower forward curved ends to gather or rake the hay in the straight-ahead movement or path of the machine. Said teeth are preferably of spring-steel to permit them to readily yield in event of their contact with an obstruction, thus avoiding the liability of the breaking of said teeth, as might otherwise occur, and they are preferably supported one from each of a series of guide-bars $2^a$, arranged below the endless belt of teeth or forks. It will be seen that the tines or teeth of the forks of the endless belt are adapted to travel or move between said stationary rake-teeth $2^\times$, thus providing for taking or elevating the hay raked up by said rake-teeth.

Duplicate rakes 3, each comprising an endless belt of teeth or forks 4, are arranged laterally or at right angles to the line of travel of the machine, with their carrying-frames 5 suitably supported at the inner ends between arms of the running-gear frame and at their outer ends by suspending-rods 6, connected to said carrying-frames and the loader-frame, respectively. The teeth or forks 4 are also preferably of spring-steel, for the like purpose recited in connection with the above-described rake-teeth. The straight-ahead raking action of the rake-teeth of the hay-loader rakes or gathers the hay in the line of its travel, while the lateral rakes rake the hay a considerable distance out of such line of travel, which hay, together with that collected by the first-named rake-teeth, is taken up and elevated by the forks of the hay-loader, thus increasing the raking capacity of said loader.

The hay-loader is actuated by gearing comprising a shaft 7, geared as at $7^a$ $7^b$ to the driving-wheel axle and carrying the belt-pulleys $7^c$, said shaft being suitably supported in the frame of said hay-loader. The lateral rakes are driven or actuated by shafts 8, geared as at $8^a$ $8^b$ to the driving-wheel axle and carrying the pulleys of the endless belts of said rakes.

As in the case of the forks of the hay-loader, so the teeth or forks of the lateral rakes are adapted by like means to be retracted or withdrawn from the raked hay just before said hay is taken and elevated by the hay-loader, as will be readily appreciated from the drawings.

Having thus fully described my invention, what I claim, and desire to secure by Letters Patent, is—

1. In a hay-loader, the combination of an elevator comprising an endless belt of rake-teeth mounted upon a suitable carrying-frame, inclined guide-bars supported from said frame, and stationary teeth secured to and near the lower ends of said guide-bars, and resting upon the surface of the ground at their free ends, substantially as set forth.

2. In a hay-loader, the combination of an elevator comprising an endless belt of rake-teeth mounted upon a suitable carrying-frame, inclined guide-bars supported from said frame, stationary rake-teeth secured to and near the lower ends of said guide-bars, and resting upon the surface of the ground at their free ends, and an endless belt of teeth adapted to move at right angles to the line of travel of the first-referred-to belt of rake-teeth, substantially as set forth.

3. In a machine of the character described, the combination of an elevator comprising a belt of rake-teeth mounted upon a suitable carrying-frame, and a belt of rake-teeth adapted to move at right angles to the line of travel of said elevator, the latter belt of rake-teeth being suspended laterally from the frame of said elevator, substantially as set forth.

4. In a machine of the character described, the combination of an elevator comprising a belt of rake-teeth mounted upon a suitable carrying-frame, belts of rake-teeth adapted to move at right angles to the line of travel of said elevator, with their carrying-frames suspended laterally from the carrying-frame of said elevator, guide-bars supported from the carrying-frame of said elevator and stationary rake-teeth fixed to the lower ends of said guide-bars, substantially as set forth.

5. In a machine of the character described, the combination of an elevator comprising a belt of rake-teeth, guide-bars supported from the carrying-frame of said belt of rake-teeth, stationary rake-teeth fixed to the lower ends of said guide-bars, belts of rake-teeth adapted to move at right angles to the line of travel of said elevator, with their carrying-frames arranged laterally of the first-referred-to frame, the inner ends of said last-referred-to frames being supported directly from the first-referred-to frame and the outer ends of said last-referred-to frames having rod connection with the first-named frame, substantially as set forth.

In testimony whereof I affix my signature in presence of two witnesses.

WM. McMEANS.

Witnesses:
J. M. LAUTHER,
C. R. WILKESON.